US010067236B2

(12) United States Patent
Inoue et al.

(10) Patent No.: US 10,067,236 B2
(45) Date of Patent: Sep. 4, 2018

(54) METHOD FOR PRESENTING RESULT OF DETERMINATION OF WHETHER VEHICLE IS STOPPED, DEVICE FOR DETERMINING WHETHER VEHICLE IS STOPPED, AND SYSTEM FOR DETERMINING WHETHER VEHICLE IS STOPPED

(71) Applicant: PANASONIC INTELLECTUAL PROPERTY MANAGEMENT CO., LTD., Osaka (JP)

(72) Inventors: Kazunori Inoue, Tokyo (JP); Yukio Shikatani, Ibaraki (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 449 days.

(21) Appl. No.: 14/893,809

(22) PCT Filed: Apr. 14, 2014

(86) PCT No.: PCT/JP2014/002102
§ 371 (c)(1),
(2) Date: Nov. 24, 2015

(87) PCT Pub. No.: WO2014/196115
PCT Pub. Date: Dec. 11, 2014

(65) Prior Publication Data
US 2016/0103226 A1 Apr. 14, 2016

(30) Foreign Application Priority Data
Jun. 4, 2013 (JP) .................................. 2013-117864

(51) Int. Cl.
G01S 19/52 (2010.01)
G01S 19/39 (2010.01)
G08G 1/01 (2006.01)

(52) U.S. Cl.
CPC .............. *G01S 19/52* (2013.01); *G01S 19/39* (2013.01); *G08G 1/0133* (2013.01)

(58) Field of Classification Search
CPC ........ G01S 19/52; G01S 19/39; G08G 1/0133
See application file for complete search history.

(56) References Cited

FOREIGN PATENT DOCUMENTS

JP 08-201070 A 8/1996
JP 11-258324 A 9/1999
(Continued)

OTHER PUBLICATIONS

English Translation of JP 2009-140292 A (Year: 2018).*
(Continued)

*Primary Examiner* — Bernarr E Gregory
*Assistant Examiner* — Fred H Mull
(74) *Attorney, Agent, or Firm* — Pearne & Gordon LLP

(57) ABSTRACT

Device (100) has: a low-speed interval extraction unit (120) for extracting, from GPS information, a low-speed interval extending from the location at a first time point at which the measured speed of a vehicle has fallen below a prescribed value, to the location at a second time point at which the speed has exceeded the prescribed value; a vehicle speed transition model generating unit (130) for generating a model having, as constraint condition, the length and the amount of time of the low-speed interval, for indicating temporal transition of the speed in such a way that the speed continuously increases to the second time point after having decreased from the first time point; and a stop determination unit (140) for determining that the vehicle has stopped within the low-speed interval, on the condition that an interval in which the speed is zero or less is present within the model.

9 Claims, 9 Drawing Sheets

(56) References Cited

FOREIGN PATENT DOCUMENTS

| | | |
|---|---|---|
| JP | 2003-296891 A | 10/2003 |
| JP | 2009-140292 A | 6/2009 |
| JP | 2009-264853 A | 11/2009 |
| JP | 2013-002893 A | 1/2010 |
| WO | 2012/172780 A1 | 12/2012 |

OTHER PUBLICATIONS

English Translation of JP 2013-002893 A (Year: 2018).*
International Search Report for Application No. PCT/JP2014/002102 dated Jul. 15, 2014.

* cited by examiner

FIG. 6

| | RELATED ART | LINEAR FUNCTION | QUADRATIC FUNCTION | QUARTIC FUNCTION |
|---|---|---|---|---|
| NUMBER OF TIMES OF DETECTION | 117 | 27 | 27 | 21 |
| NUMBER OF TIMES OF MISSED DETECTION | 0 TO 7 | 2 | 5 | 9 |
| NUMBER OF TIMES OF FALSE DETECTION | 55 TO 91 | 3 | 6 | 4 |

METHOD FOR PRESENTING RESULT OF DETERMINATION OF WHETHER VEHICLE IS STOPPED, DEVICE FOR DETERMINING WHETHER VEHICLE IS STOPPED, AND SYSTEM FOR DETERMINING WHETHER VEHICLE IS STOPPED

TECHNICAL FIELD

The present invention relates to a method for providing a result of determining whether a vehicle has stopped (hereinafter, "vehicle-stop determination result providing method"), an apparatus for determining whether a vehicle has stopped (hereinafter, vehicle-stop determination apparatus), and also to a system for determining whether a vehicle has stopped (hereinafter, "vehicle-stop determination system"), each determining whether the vehicle has stopped from GPS information of the vehicle.

BACKGROUND ART

In analysis of road traffic conditions, the traveling status of each vehicle, for example, whether the vehicle has stopped sometimes becomes an important element. Recently, determining whether the vehicle has stopped, using a Global Positioning System (GPS) has been put into practical use.

The GPS is a positioning system for locating (i.e., positioning), on the basis of a signal transmitted from a plurality of artificial satellites above the sky (hereinafter, referred to as "GPS signal"), the current position of a receiver that receives the GPS signal. Installing the receiver in a vehicle to calculate the time difference in positions from time series data of current positions, for example, enables measurement of the velocity of the vehicle at the respective times.

However, due to the principle of GPS, the lower the moving velocity of the receiver becomes, the lower the detection accuracy of time difference in positions becomes. Accordingly, when the moving velocity of the receiver is low (e.g., about 10 km/h or lower), the measurement simply using the time difference in positions cannot measure velocities with high accuracy, thus resulting in only low accuracy measurement. That is, it is impossible to determine accurately whether a vehicle has stopped on the basis of the velocity measurement simply using the time difference in positions.

Under such circumstances, Patent Literature (hereinafter, referred to as "PTL") 1 and PTL 2, for example, disclose a technique of determining that a vehicle has stopped, on condition that the velocity measured from time differences in positions is equal to or lower than a threshold value higher than zero. According to the technique disclosed in PTLs 1 and 2, setting the threshold value sufficiently high makes it possible to determine more securely that a vehicle has stopped when there is a possibility that a vehicle has stopped.

However, the technique according to PTLs 1 and 2 may determine that a vehicle has stopped although the vehicle has not stopped in reality. Meanwhile, setting the threshold value lower in order to prevent such a false determination reduces the accuracy of the determination whether or not the velocity is equal to or lower than the threshold value. In this case, the possibility of determining that the vehicle has stopped although the vehicle has not stopped in reality may rather increase. Further, the possibility of determining that a vehicle has not stopped although the vehicle has stopped in reality may also increase.

Under such circumstances, PTL 3, for example, discloses a technique of using yet another condition to determine whether a vehicle has stopped. The technique disclosed in PTL 3 measures the direction of a velocity vector from the time difference in positions. The technique disclosed in PTL 3 determines that a vehicle has stopped on conditions that a velocity measured from the time difference in positions is equal to or lower than a predetermined value which is higher than zero, and that the change of the direction of the velocity vector is large. This technique is based on the fact that the lower the velocity of a vehicle becomes, the lower the detection accuracy of the velocity vector becomes. According to the technique disclosed in PTL 3, it is possible to reduce the possibility of determining that a vehicle has stopped although the vehicle has not stopped in reality.

CITATION LIST

Patent Literature

PTL 1
Japanese Patent Application Laid-Open No. 8-201070
PTL 2
Japanese Patent Application Laid-Open No. 11-258324
PTL 3
Japanese Patent Application Laid-Open No. 2009-264853

SUMMARY OF INVENTION

Technical Problem

Depending on the status of reception of GPS information, however, the direction of a velocity vector may change largely although a vehicle has not stopped in reality.

The reasons for such changes are as follows. For example, when a structure that reflects a radio wave is present in the surroundings, and the velocity of a vehicle is not high enough, the measurement of positions is subjected to continuous influence of the reflected wave due to the structure, which causes an error or a variation in the results of the measurement of positions. That is, when the velocity of a vehicle is low, a velocity vector due to the above-mentioned error or variation may even have a larger influence than a velocity vector due to the movement of the vehicle itself. Accordingly, the technique disclosed in PTL 3 may wrongly determine that a vehicle has stopped although the vehicle has not stopped in reality.

An object of the present invention is to provide a vehicle-stop determination result providing method, a vehicle-stop determination apparatus, and a vehicle-stop determination system, each capable of determining whether a vehicle has stopped with high accuracy from GPS information of a vehicle.

Solution to Problem

The vehicle-stop determination result providing method of the present disclosure includes: acquiring a measured velocity which is a velocity of a vehicle obtained from GPS information of the vehicle, and providing the vehicle with a result of a stop determination performed based on the measured velocity, in which the stop determination is to determine that the vehicle has stopped during an interval from a first time point to a second time point when there is a section in which the velocity is zero or lower in a vehicle velocity transition model where the velocity decreases from the first time point and subsequently increases continuously to the second time point among vehicle velocity transition models indicating temporal transition of the velocity from the first time point at which the measured velocity falls below a predetermined value to the second time point at which the measured velocity exceeds a predetermined value.

The vehicle-stop determination apparatus of the present disclosure is a vehicle-stop determination apparatus that determines from GPS information of a vehicle whether the vehicle has stopped, the apparatus including: a low-velocity-section extracting section that extracts a low velocity section being a section from a position of the vehicle at a first time point at which a measured velocity falls below a predetermined value to a position of the vehicle at a second time point at which the measured velocity exceeds a predetermined value, the measured velocity being a velocity of the vehicle obtained from the GPS information; a vehicle-velocity-transition-model generating section that generates a vehicle velocity transition model indicating temporal transition of a velocity which decreases from the first time point and subsequently increases continuously to the second time point, using, as constraint conditions, a section distance which is a length of the extracted low velocity section and a time from the first time point to the second time point; and a stop determination section that determines that the vehicle has stopped in the low velocity section, on condition that there is a section in which the velocity is zero or lower, in the generated vehicle velocity transition model.

The vehicle-stop determination system of the present disclosure is a vehicle-stop determination system that determines from GPS information of a vehicle whether the vehicle has stopped, the vehicle-stop determination system including: a terminal apparatus installed in the vehicle; and a server apparatus that processes information concerning a traveling status of the vehicle, in which the terminal apparatus includes a GPS receiving section that receives a GPS signal, and acquires GPS information of the vehicle from the received GPS signal, and a traveling data transmitting section that transmits to the server apparatus traveling data including the acquired GPS information and identification information of the vehicle, and the server apparatus includes a traveling data receiving section that receives the traveling data transmitted from the terminal apparatus, a low-velocity-section extracting section that extracts a low velocity section being a section from a position of the vehicle at a first time point at which a measured velocity falls below a predetermined value to a position of the vehicle at a second time point at which the measured velocity exceeds a predetermined value, the measured velocity being obtained by measuring a velocity of the vehicle from the received traveling data, a vehicle-velocity-transition-model generating section that generates a vehicle velocity transition model indicating temporal transition of a velocity which decreases from the first time point and subsequently increases continuously to the second time point, using, as constraint conditions, a section distance which is a length of the extracted low velocity section and a time from the first time point to the second time point, a stop determination section that determines that the vehicle has stopped in the low velocity section, on condition that there is a section in which the velocity is zero or lower in the generated vehicle velocity transition model, and a determination result output section that outputs a determination result determined by the stop determination section.

Advantageous Effects of Invention

According to the present invention, it is possible to determine with high accuracy whether a vehicle has stopped from GPS information of the vehicle.

BRIEF DESCRIPTION OF DRAWINGS

FIG. 6 is a diagram showing the results of an experiment concerning the vehicle-stop determination apparatus according to Embodiment 1;

DESCRIPTION OF EMBODIMENTS

Hereinafter, embodiments of the present invention will be described in detail with reference to the drawings.

Embodiment 1

Embodiment 1 of the present invention is an example of the specific mode of a vehicle-stop determination apparatus according to the present invention.

<Configuration of Vehicle-Stop Determination Apparatus>

First, the configuration of a vehicle-stop determination apparatus according to the present embodiment will be described.

Figure 1:
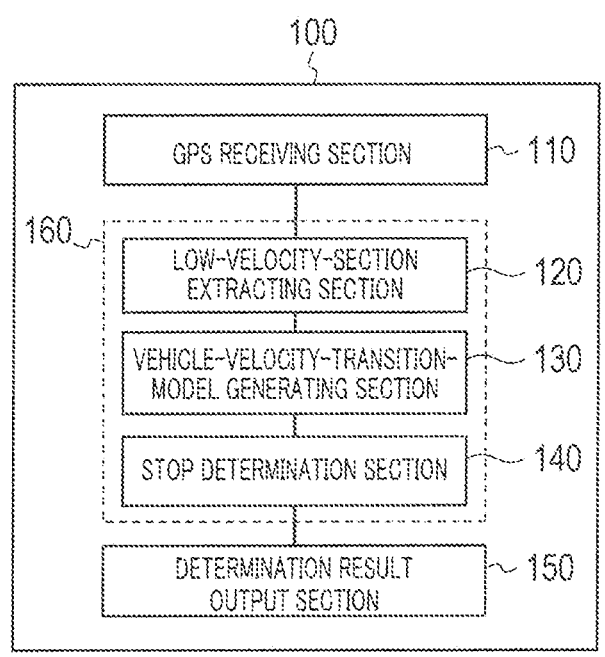
FIG. 1 is a block diagram illustrating an example of a configuration of a vehicle-stop determination apparatus according to Embodiment 1 of the present invention.

FIG. 1 is a block diagram illustrating an example of the configuration of the vehicle-stop determination apparatus according to the present embodiment.

In FIG. 1, vehicle-stop determination apparatus 100 determines whether a vehicle has stopped from GPS information of the vehicle. Vehicle-stop determination apparatus 100 is, for example, an on board unit (OBU) installed in a vehicle, or an information terminal carried by a passenger of the vehicle. Hereinafter, the vehicle in which vehicle-stop determination apparatus 100 is installed is simply referred to as "vehicle."

Vehicle-stop determination apparatus 100 includes GPS receiving section 110, low-velocity-section extracting section 120, vehicle-velocity-transition-model generating section 130, stop determination section 140, and determination result output section 150.

GPS receiving section 110 receives a GPS signal transmitted from a plurality of artificial satellites above the sky using a GPS antenna. GPS receiving section 110 acquires, based on the received GPS signal, a receiving time of the GPS signal, a position of a vehicle at a time when the GPS signal is received, and a velocity of the vehicle at the time when the GPS signal is received, as GPS information. The receiving time of the GPS signal is expressed, for example, in GPS reference time, or Japanese Standard Time converted from the GPS reference time. The position of the vehicle is expressed, for example, by latitude and longitude. GPS receiving section 110 outputs the acquired GPS information to low-velocity-section extracting section 120.

Note that the velocity may be acquired, for example, by dividing the difference between two positions by the difference between two times corresponding to the two positions. Alternatively, the velocity may be acquired, for example, by utilizing the wavelength variation (Doppler effect) of a carrier wave from a GPS signal. In the following description, the velocity of a vehicle obtained from GPS information (included in the GPS information) is referred to as "measured velocity."

Low-velocity-section extracting section 120 extracts a low velocity section based on the GPS information input from GPS receiving section 110. Low-velocity-section extracting section 120 acquires a section distance and a required time of the extracted low velocity section, and outputs the acquired section distance and required time to vehicle-velocity-transition-model generating section 130. Here, the low velocity section means a section from a position of a vehicle at a time when the measured velocity falls below a predetermined value to a position of the vehicle at a time when the measured velocity exceeds a predetermined value. The section distance means a length of the low velocity section. The required time means a time required for the vehicle to pass through the low velocity section.

It is noted that the "time when the measured velocity falls below a predetermined value" means a time at which the measured value transits from a value more than the predetermined value to a value equal to or less than the predetermined value across the predetermined value. Further, the "time when the measured velocity falls below a predetermined value" may indicate a time at which the measured value transits from a value equal to or more than the predetermined value to a value less than the predetermined value across the predetermined value. In the following description, the time when the measured velocity falls below the predetermined value is referred to as "first time point," and the point at which the vehicle is positioned at the first time point is referred to as "first point."

Further, the "time when the measured velocity exceeds a predetermined value" means a time at which the measured value transits from a value equal to or less than the predetermined value to a value more than the predetermined value across the predetermined value. Meanwhile, the "time when the measured velocity exceeds a predetermined value" may indicate a time at which the measured value transits from a value less than the predetermined value to a value equal to or more than the predetermined value across the predetermined value. In the following description, the time when the measured velocity exceeds the predetermined value is referred to as "second time point," and the point at which the vehicle is positioned at the second time point is referred to as "second point." Further, the above-mentioned required time corresponds to, i.e., an interval from the first time point to the second time point.

Further, the low velocity section is defined as one continuous section. That is, if a time when the measured velocity falls below the predetermined value is set as a starting point, the low velocity section is a section between the starting section and an ending point at which the measured velocity initially exceeds the predetermined value afterward.

In the present embodiment, the predetermined value corresponding to the first time point and the predetermined value corresponding to the second time point both defining the low velocity section are identical. The predetermined value is desirably a minimum value of a velocity value that allows a GPS to obtain sufficient positioning accuracy and is 10 km/h, for example.

Vehicle-velocity-transition-model generating section 130 generates a vehicle velocity transition model using, as constraint conditions, a section distance and a required time of the low velocity section input from low-velocity-section extracting section 120. Here, the vehicle velocity transition model is a model indicating temporal transition of velocity which decreases continuously from the predetermined value and subsequently increases continuously to the predetermined value. Vehicle-velocity-transition-model generating section 130 outputs the generated vehicle velocity transition model to stop determination section 140.

In the present embodiment, the vehicle velocity transition model is a model having a shape of being convex in the direction of negative velocity and of continuously changing in the time-axis direction, in the two-dimensional space composed of the time axis and the velocity axis.

Stop determination section 140 determines that a vehicle has stopped in the low velocity section on condition that there is a section in which the velocity is zero or lower, in the vehicle velocity transition model input from vehicle-velocity-transition-model generating section 130. Then, stop determination section 140 outputs a determination result to determination result output section 150.

When the determination result that the vehicle has stopped in the low velocity section is input from stop determination section 140, determination result output section 150 outputs the determination result to the outside of vehicle-stop determination apparatus 100.

Here, the term "outside of vehicle-stop determination apparatus 100" refers to a recording medium such as a nonvolatile memory or a magnetic recording memory attached to vehicle-stop determination apparatus 100, a display such as a liquid crystal display connected to vehicle-stop determination apparatus 100, and a counterpart of wireless communication, such as a server of a traffic control center. That is, the term "output of determination result output section 150" refers to transmission by means of wired data communication or wireless data communication, electric signal transmission by means of substrate wiring, and writing to a storage apparatus or a recording medium.

Note that, it is also possible to employ only main component section 160 composed of low-velocity-section extracting section 120, vehicle-velocity-transition-model generating section 130, and stop determination section 140, as the vehicle-stop determination apparatus according to an embodiment of the present invention.

Further, vehicle-stop determination apparatus 100 has, for example, a central processing unit (CPU), a storage medium such as a read-only memory (ROM) in which a control program is stored, and a working memory such as a random access memory (RAM), although they are not illustrated. In this case, the functions of the above-mentioned respective sections are archived by execution of the control program by CPU.

Such vehicle-stop determination apparatus 100 can generate a vehicle velocity transition model, and determine whether a vehicle has stopped in the low velocity section based on the generated vehicle velocity transition model. Hereinafter, the determination whether a vehicle has stopped in the low velocity section is referred to as "stop determination."

<Principle of Stop Determination>

Next, the principle of the stop determination in the present embodiment will be described. First, the properties of the traveling status of a vehicle and the properties of the vehicle velocity transition model will be described. Then, the reason why vehicle-stop determination apparatus 100 can perform stop determination with high accuracy will be described with the relationship between these properties.

<Properties of Traveling Status of Vehicle>

First, the properties of the actual traveling status of a vehicle in the low velocity section will be described.

Figure 2:
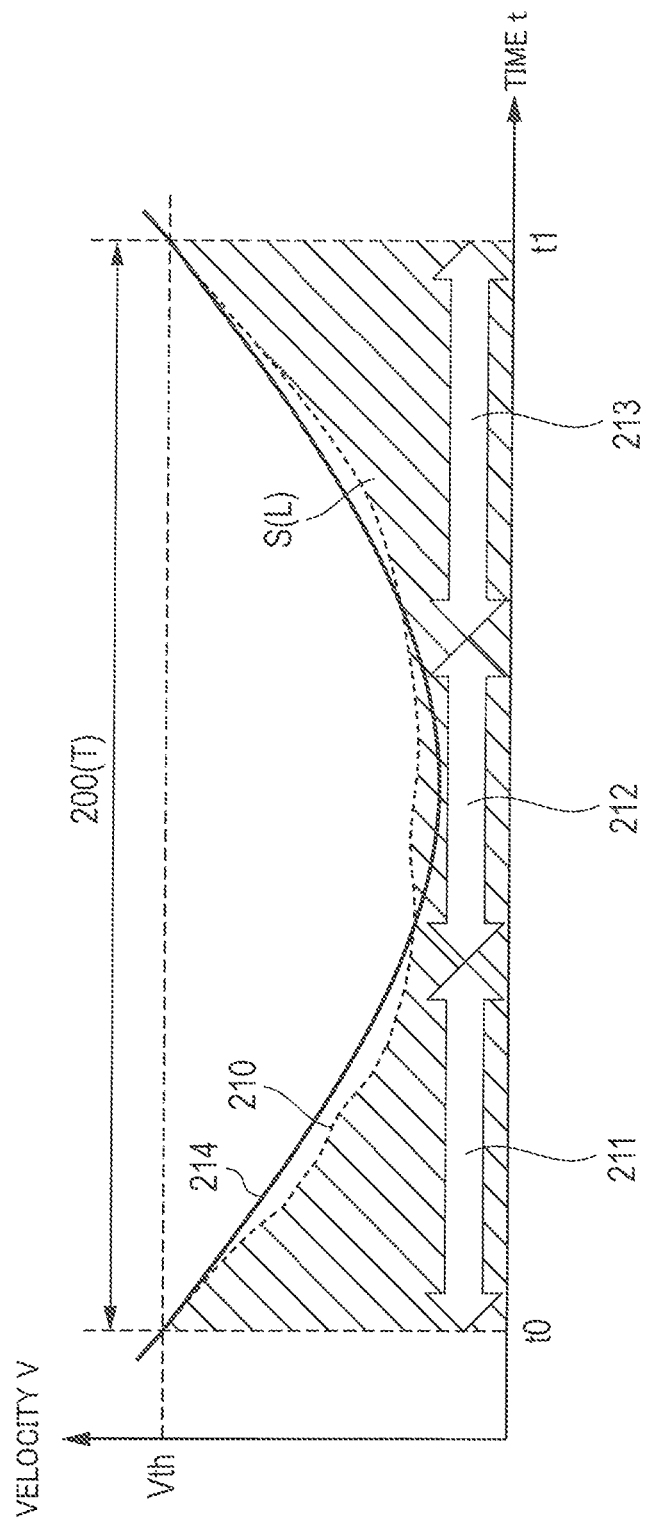
FIG. 2 is a diagram illustrating an example of vehicle velocity transition in a low velocity section in Embodiment 1.

FIG. 2 is a diagram illustrating an example of the temporal transition of the velocity of a vehicle in the low velocity section. In FIG. 2, the abscissa-axis indicates time, and the ordinate-axis indicates velocity. Further, in the diagram, a portion below the abscissa-axis corresponds to an area of negative velocity.

As illustrated in FIG. 2, the velocity of the vehicle is threshold velocity Vth at first time point t0 and second time point t1 of low velocity section 200.

When a vehicle typified by an automobile runs, usually, a sharp velocity change or a discontinuous change hardly occurs. When the vehicle runs without stopping at a low velocity of less than the velocity of a predetermined value (hereinafter, referred to as "threshold velocity") Vth, as in low velocity section 200, it is highly probable that the temporal transition of the vehicle velocity (hereinafter, referred to as "vehicle velocity transition") 210 includes one deceleration section 211, one constant velocity section 212, and one acceleration section 213, in this order. That is, the shape of vehicle velocity transition 210 in low velocity section 200 is approximate to downward convex shape 214.

Here, deceleration section 211 is a section in which the vehicle velocity decreases continuously mainly due to a brake operation. Constant velocity section 212 is a section in which the vehicle velocity is kept approximately constant mainly due to inertia. Acceleration section 213 is a section in which the vehicle velocity increases continuously mainly due to an acceleration operation or a creep phenomenon.

Even when plural deceleration sections 211, constant velocity sections 212, and acceleration sections 213 are included, in reality, the velocity change through the respective times transits largely gently on the time axis, and, as a whole, is still closer to downward convex shape 214 as illustrated in FIG. 2. Hereinafter, such a shape as to decrease continuously and subsequently increase continuously is referred to as "downward convex shape."

Further, time integration S of vehicle velocity transition 210 (area indicated by hatching) coincides with a route on which the vehicle travels in low velocity section 200. Here, the term "route" refers to an integrated value of the distance which the vehicle travels. For example, when the vehicle moves backward halfway on a road and moves forward again, the route means the length including the roundtrip distance of the section.

However, it is rare that a vehicle moves backward on a public road. Therefore, the route usually coincides with the section distance that is a distance which the vehicle travels in low velocity section 200. Here, when the vehicle moves backward halfway on a road and moves forward again, the distance means a length not including the roundtrip distance of the section, and being approximate to the length of a road on which the vehicle travels.

Accordingly, time integration S of vehicle velocity transition 210 coincides with the section distance of low velocity section 200 (hereinafter, symbol L is used therefor).

To summarize the above description, the actual traveling status of the vehicle in low velocity section 200 has properties of indicating vehicle velocity transition 210, which is approximate to downward convex shape 214 having a starting point and an ending point at threshold velocity Vth in the required time (hereinafter, symbol T is used therefor) and in which time integration S coincides with section distance L.

<Properties of Vehicle Velocity Transition Model>

Next, the properties of the vehicle velocity transition model will be described.

Figure 3:
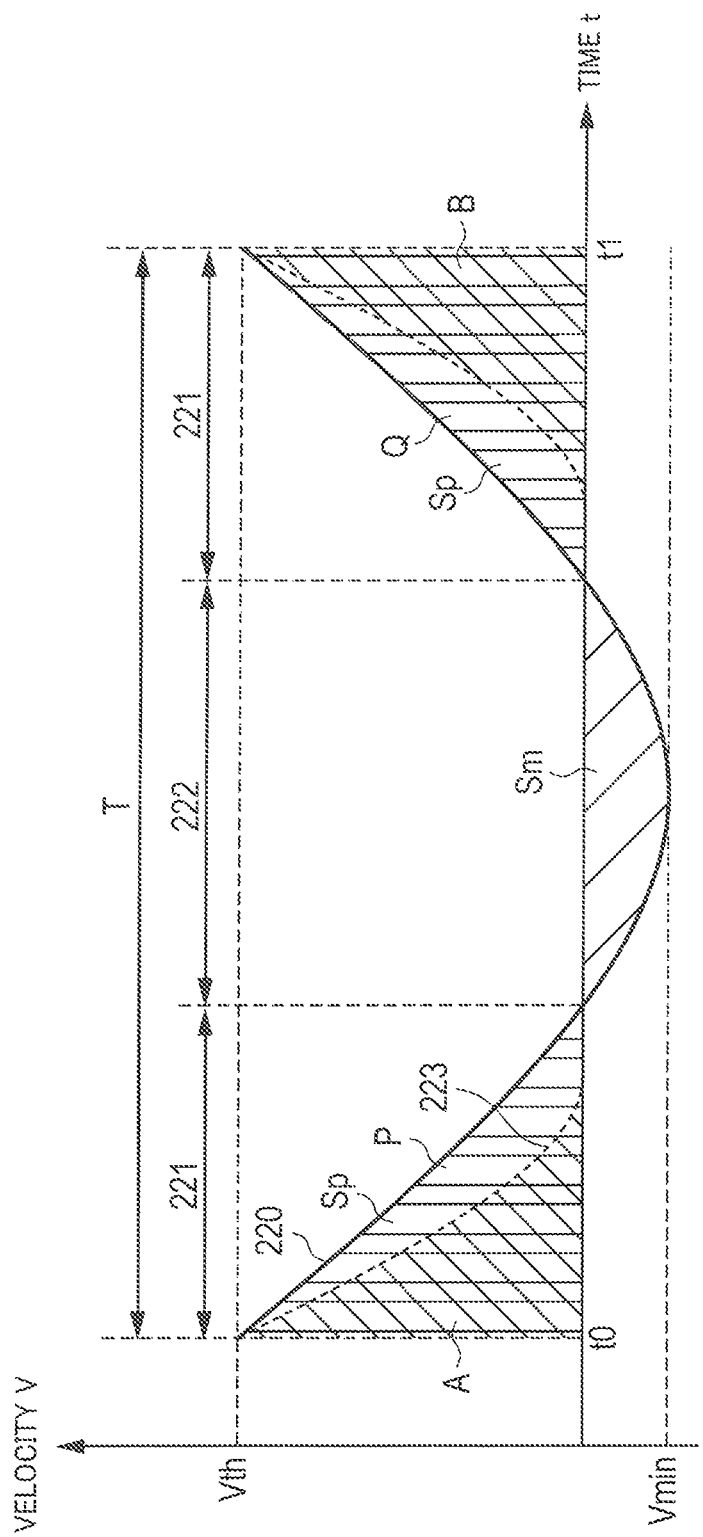
FIG. 3 is a diagram illustrating an example of the shape of a vehicle velocity transition model in Embodiment 1.

FIG. 3 is a diagram illustrating an example of the shape of a vehicle velocity transition model, and corresponds to FIG. 2.

Here, the properties of a vehicle velocity transition model having a quadratic function shape will be described. Vehicle-velocity-transition-model generating section 130 generates vehicle velocity transition model 220 in a quadratic function shape in which the velocity is convex in the direction of negative velocity from threshold velocity Vth, using section distance L and required time T in the low velocity section, as constraint conditions.

More specifically, when pseudo interpolation function f(t) which is a function exhibiting the shape of vehicle velocity transition model 220 is in a quadratic function shape, the function f(t) is represented by the following equation:

[1]

$$f(t)=at^2+bt+c \qquad \text{(Equation 1)}.$$

Further, parameters a, b and c of the pseudo interpolation function f(t) are determined from the above-described condition of the low velocity section and the constraint condition. The above-described constraint condition is represented, for example, by the following equation:

[2]

$$\int_0^T f(t)dt=L \qquad \text{(Equation 2)}.$$

When this Equation 2 is employed as a constraint condition, the parameters a, b and c of the pseudo interpolation function f(t) are represented by Equations 3 to 5 mentioned below. Accordingly, vehicle-velocity-transition-model generating section 130 determines the pseudo interpolation function f(t), for example, using the below-mentioned Equations 3 to 5 and the above-mentioned Equation 1. Here, $V_0$ and $V_1$ are, respectively, the above-mentioned predetermined value corresponding to the first time point and the above-mentioned predetermined value corresponding to the second time point, and are equal to Vth in the present embodiment.

[3] (Equation 3)

$$a = \frac{3T(V_0 + V_1) - 6L}{T^3}$$

[4]
$$b = \frac{6L - 2T(2V_0 + V_1)}{T^2}$$
(Equation 4)

[5]
$$c = V_0$$
(Equation 5)

It is noted that the parameter c is not used in the subsequent processing. Therefore, vehicle-velocity-transition-model generating section 130 does not necessarily need to determine the parameter c.

In vehicle velocity transition model 220 of the pseudo interpolation function f(t) thus calculated, velocity local minimum value Vmin may be zero or lower, as illustrated in FIG. 3, depending on section distance L and required time T which are constraint conditions. Note that local minimum value Vmin refers to a concept including a local minimum value, i.e., the smallest value near a certain point in the pseudo interpolation function f(t). In this description, the pseudo interpolation function f(t) is a quadratic function, and thus the smallest value of the entire pseudo interpolation function f(t) is necessarily included in local minimum value Vmin.

When section distance L is small relative to required time T, velocity minimum value Vmin becomes zero or lower in the above-described manner. This is because, vehicle velocity transition model 220 is generated such that the time integration of the velocity (hereinafter, symbol S' is used therefor) coincides with section distance L. That is, when section distance L is small, the constraint conditions are not satisfied unless time integration of the velocity in section 222 where the velocity is minus (hereinafter, referred to as "minus section") (Sm) (area indicated by slanted hatching) is subtracted from time integration of the velocity in section 221 where the velocity is plus (Sp) (area indicated by vertical hatching).

To summarize the above description, vehicle velocity transition model 220 has such a downward convex shape as to have a starting point and an ending point both at threshold velocity Vth in required time T, and such that time integration S' coincides with section distance L. Further, vehicle velocity transition model 220 has a property in which, when section distance L is small relative to required time T, velocity minimum value Vmin may become zero or lower.

<Reason why Stop Determination can be Performed with High Accuracy>

Next, the reason why the stop determination can be performed with high accuracy will be described.

As described above, the actual traveling status of a vehicle in low velocity section 200, and the vehicle velocity transition model have common characteristics of being in a downward convex shape having a starting point and an ending point both at threshold value Vth, and of the time integration coinciding with section distance L. Accordingly, at least in a vehicle that has not stopped in the low velocity section, the vehicle velocity transition model accurately reflects its traveling status.

On the other hand, when the vehicle has stopped in the low velocity section, vehicle velocity transition 223 in the low velocity section has a shape of flat bottom, which shape is different from that of vehicle velocity transition model 220, as illustrated in FIG. 3.

Vehicle velocity transition model 220 is generated such that its time integration S' coincides with time integrations A+B of the velocity of vehicle velocity transition 223 of the vehicle that has stopped in the low velocity section. Accordingly, vehicle velocity transition model 220 is generated such that the time integration of minus section 222 (Sm) offsets portions P and Q which exceed time integrations A+B, out of time integration S' of vehicle velocity transition model 220. Therefore, the presence of minus section 222 means that the above-described constraint conditions are not satisfied without this offset.

That is, the presence of minus section 222 means that vehicle velocity transition 223 has a shape of flat bottom, i.e., that the vehicle has stopped in the low velocity section.

Further, as for a vehicle that has not stopped in the low velocity section, the vehicle velocity transition model accurately reflects its traveling status, and thus the vehicle velocity transition model does not have minus section 222.

That is, the absence of minus section 222 means that the vehicle has not stopped in the low velocity section.

Accordingly, vehicle-stop determination apparatus 100 can perform stop determination with high accuracy using a condition of determining whether or not there is a section in which the velocity is zero or lower in the vehicle velocity transition model.

<Details of Stop Determination>

Next, the details of the stop determination will be described.

Figure 4B:
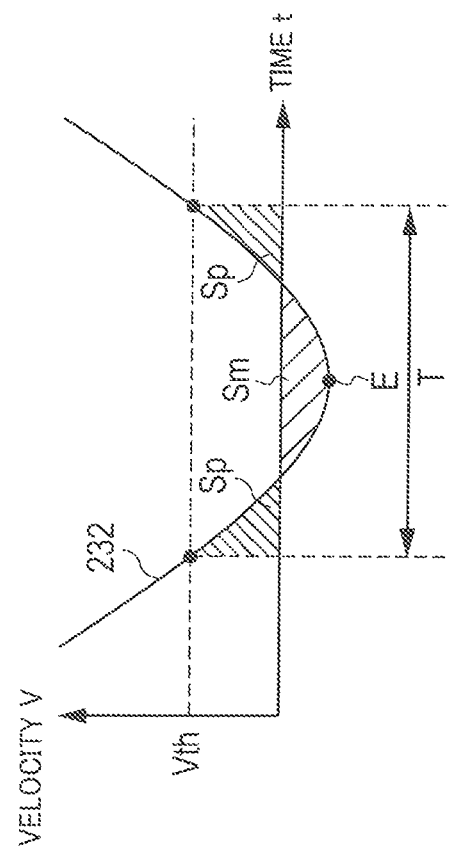
FIGS. 4A and 4B are diagrams illustrating examples of how stop determination in Embodiment 1 is performed.
Figure 4A:
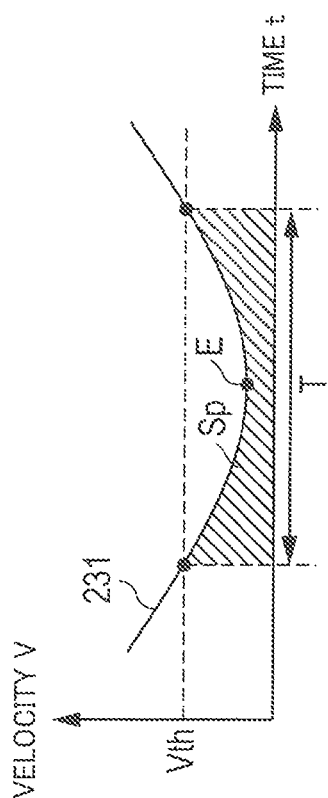

FIGS. 4A and 4B are diagrams illustrating examples of how stop determination using a vehicle velocity transition model is performed. FIG. 4A illustrates a vehicle velocity transition model in a case where a vehicle does not stop in the low velocity section. FIG. 4B illustrates a vehicle velocity transition model in a case where a vehicle stops in the low velocity section.

As illustrated in FIGS. 4A and B, vehicle velocity transition model 231 in a case where the vehicle does not stop in the low velocity section and vehicle velocity transition model 232 in a case where a vehicle stops in the low velocity section are identical in threshold velocity Vth and required time T, but are different in the degree of downward protrusion.

In a case where the vehicle does not stop in the low velocity section, section distance L is usually longer than that in a case where the vehicle stops in the low velocity section, even though required time T is the same in both cases. Accordingly, time integration of plus velocity (Sp) becomes sufficiently large. Along with that, the amount of protrusion of vehicle velocity transition model 232, i.e., the difference between threshold velocity Vth and local minimum value E becomes small.

On the other hand, in a case where the vehicle stops in the low velocity section, section distance L is usually shorter than that in a case where the vehicle does not stop in the low velocity section, even though required time T is the same in both cases. At that time, time integration of plus velocity (Sp) becomes small. Along with that, the amount of protrusion of vehicle velocity transition model 232 becomes larger, allowing time integration of minus velocity (Sm) to be present.

However, a vehicle does not move backward on a road, in reality. Therefore, this time integration of minus velocity (Sm) does not reflect the actual velocity, but is considered to be a component generated in order to compensate (offset) for the stop of the vehicle.

Vehicle-velocity-transition-model generating section 130 generates, for example, the above-mentioned pseudo interpolation function f(t), and outputs the generated pseudo interpolation function f(t) as a vehicle velocity transition model to stop determination section 140.

In this case, stop determination section 140 determines whether or not local minimum value E of the velocity in the pseudo interpolation function f(t) is zero or lower. Then, when local minimum value E is zero or lower, as in vehicle velocity transition model 232 illustrated in FIG. 4B, stop determination section 140 determines that the vehicle has stopped in the low velocity section.

That is, stop determination section 140 calculates an extreme value of the pseudo interpolation function f(t) using Equation 6 mentioned below, and compares the calculated result with zero.

[6]
$$f\left(-\frac{b}{2a}\right) = -\frac{b^2 - 4ac}{4a}$$
(Equation 6)

It is noted that, when minimum value E of the velocity in the pseudo interpolation function f(t) is not zero or lower, as in vehicle velocity transition model 231 illustrated in FIG. 4A, stop determination section 140 may be configured to determine that the vehicle has not stopped in the low velocity section.

Further, vehicle-stop determination apparatus 100 does not necessarily need to calculate the pseudo interpolation function f(t), and may be configured to calculate an extreme value of the pseudo interpolation function f(t) using, for example, Equation 6. However, the parameters a, b and c of the pseudo interpolation function f(t) need to be calculated, which parameter calculation corresponds to the generation of the vehicle velocity transition model.

<Operation of Vehicle-Stop Determination Apparatus>

Next, the operations of vehicle-stop determination apparatus 100 will be described.

Figure 5:
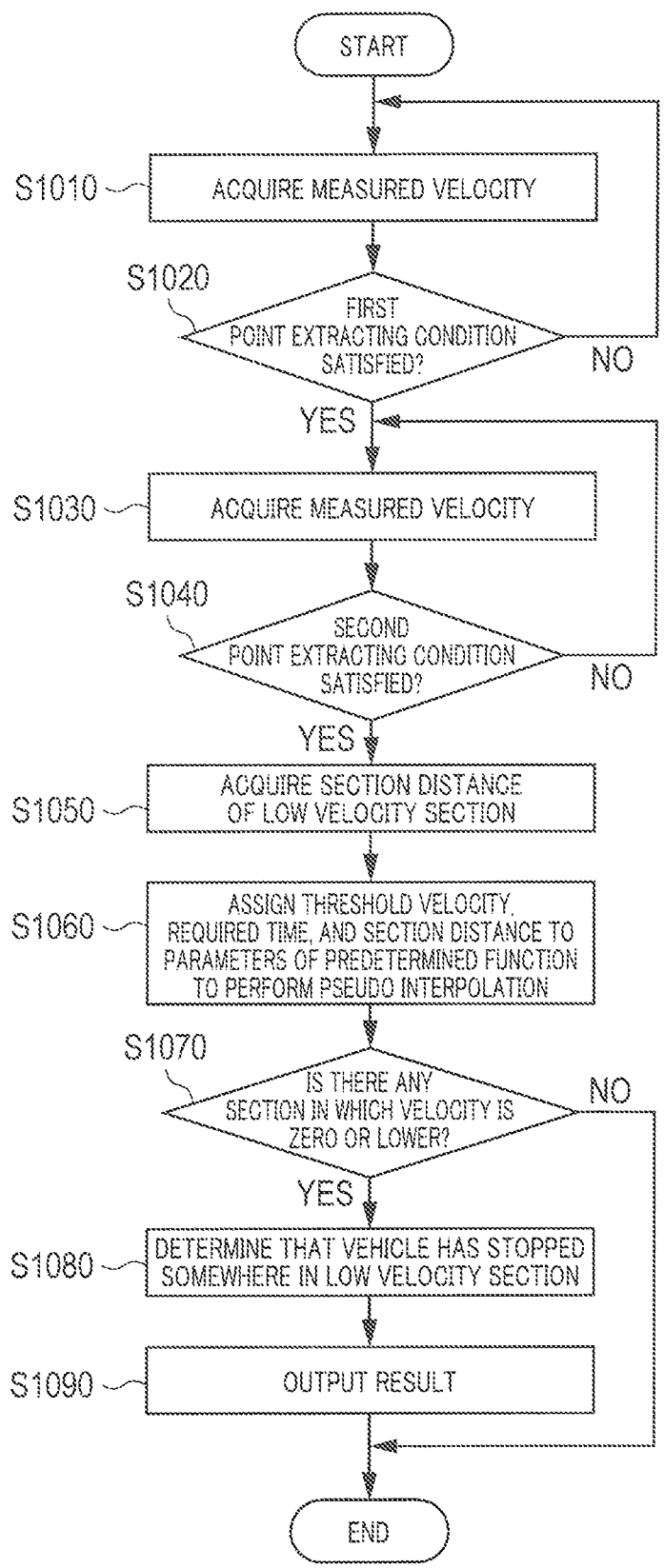
FIG. 5 is a flow chart showing an example of the operations of the vehicle-stop determination apparatus according to Embodiment 1.

FIG. 5 is a flow chart showing an example of the operations of vehicle-stop determination apparatus 100. Vehicle-stop determination apparatus 100 performs operations described below every time there is an instruction to perform stop determination, for example. Further, GPS receiving section 110 is presumed to successively receive a GPS signal and acquire GPS information.

First, low-velocity-section extracting section 120 acquires a measured velocity from the GPS information obtained by GPS receiving section 110 (Step S1010), and repeats the processing of determining whether a first point extracting condition is satisfied until this condition is satisfied (Step S1020: NO).

Here, the first point extracting condition is a condition where the measured velocity falls below threshold velocity Vth. Low-velocity-section extracting section 120 performs the determination processing of Step S1020, for example, by determining whether the conditions where the measured velocity input right before the latest measured velocity exceeds threshold velocity Vth, and where the latest measured velocity input most recently is equal to or lower than threshold velocity Vth are satisfied.

When the first point extracting condition is satisfied (Step S1020: YES), low-velocity-section extracting section 120 moves the processing to Step S1030. At that time, low-velocity-section extracting section 120 records the time and the position of the vehicle at the time point at which the first point extracting condition is satisfied, respectively, as a first time point and a first point.

Then, low-velocity-section extracting section 120 acquires a measured velocity from the GPS information obtained by GPS receiving section 110 (Step S1030), and repeats the processing of determining whether a second point extracting condition is satisfied until this condition is satisfied (Step S1040: NO).

Here, the second point extracting condition is a condition where the measured velocity exceeds threshold velocity Vth. Low-velocity-section extracting section 120 performs the determination processing of Step S1040, for example, by determining whether or not the conditions where the measured velocity input right before the latest measured velocity is equal to or lower than threshold velocity Vth, and where the latest measured velocity input most recently exceeds threshold velocity Vth are satisfied.

When the second point extracting condition is satisfied (Step S1040: YES), low-velocity-section extracting section 120 moves the processing to Step S1050. At that time, low-velocity-section extracting section 120 records the time and the position of the vehicle at the time point at which the second point extracting condition is satisfied, respectively, as a second time point and a second point.

Then, low-velocity-section extracting section 120 acquires the distance between the first point and the second point as section distance L of the low velocity section. At that time, low-velocity-section extracting section 120 acquires the difference between the first point and the second point as required time T of the low velocity section.

The section distance L of the low velocity section may be acquired either based on the positions of the vehicle acquired a plurality of times from the first point to the second point, or based on map data. Further, when the distance between the first point and the second point is extremely short or when there is only a straight road, the linear distance between the first point and the second point may be simply defined as section distance L.

Then, vehicle-velocity-transition-model generating section 130 assigns threshold velocity Vth which is a velocity at the first point and the second point, and the acquired required time T and section distance L to the parameters of a predetermined function (quadratic function in the present embodiment) so as to perform pseudo interpolation (Step S1060). That is, vehicle-velocity-transition-model generating section 130 generates pseudo interpolation function f(t) exhibiting the shape of the vehicle velocity transition model using the above-mentioned Equations 1 to 5.

Then, stop determination section 140 determines whether or not there is a section in which the velocity is zero or lower in the vehicle velocity transition model (Step S1070), as a result of the pseudo interpolation. That is, stop determination section 140 determines whether or not the extreme value of the pseudo interpolation function f(t) becomes zero or lower.

When there is a section in which the velocity is zero or lower (S1070: YES), stop determination section 140 determines that the vehicle has stopped somewhere in the low velocity section (Step S1080). Then, determination result output section 150 outputs such a determination result (Step S1090).

On the other hand, when there is no section in which the velocity is zero or lower (S1070: NO), stop determination section 140 terminates the processing without advancing the processing to another step.

According to such operations, it is possible to generate a vehicle velocity transition model, and to perform highly accurate stop determination based on the generated vehicle velocity transition model.

\<Variation of Shape of Vehicle Velocity Transition Model\>

Hereinbefore, the case of employing the shape of a quadratic function as the shape of the vehicle velocity transition model has been described. However, it is also possible to employ, as the shape of the vehicle velocity transition model, the shape of another function, instead of the quadratic function. As such a function, any function can be employed as long as the function is approximate to the actual vehicle velocity transition of a vehicle in the low velocity section (see FIG. 2).

For example, a skilled driver or a cargo vehicle driver often performs such driving operations as to avoid a sharp velocity change near zero velocity, in order to alleviate the stress of a passenger or the damage to a cargo. When such driving operations are performed, the vehicle velocity transition in the low velocity section of the vehicle becomes closer to the shape of quartic function. In an attempt to further avoid a velocity change, the vehicle velocity transition in the low velocity section of the vehicle becomes closer to the shape of a further higher order function. However, the higher order function has a characteristic in that a velocity change becomes sharp at a location distant from the extreme value. Therefore, it is desirable to set a vehicle velocity transition model using a degree in accordance with the actual movement of the vehicle.

Further, for example, a driver who is not good at delicate accelerating and decelerating operations, or a long-distance driver sometimes performs such driving operations that the acceleration is approximately constant. When such driving operations are performed, the vehicle velocity transition in the low velocity section of the vehicle becomes closer to the shape of a V-shaped linear function.

Further, for example, an unskilled driver or a driver who likes to stop and start abruptly often performs driving operations accompanied by a sharp velocity change. When such driving operations are performed, the vehicle velocity transition in the low velocity section of the vehicle becomes closer to the shape of rising sharply near zero velocity and becoming gradually gentle, for example, the shape of sin(t) which is one type of trigonometric function.

It is noted that the shape of the above-mentioned quadratic function has an intermediate shape between the shapes of a quartic function and a linear function.

That is, the shape of the vehicle velocity transition model which is the most approximate to the vehicle velocity in the low velocity section varies for each target of the stop determination. Accordingly, it is desirable to use a vehicle velocity transition model having the most appropriate shape, in accordance with the properties (properties of a driver, properties of a vehicle, conditions of a vehicle, and external circumstances such as whether a driver is in a hurry) of a target of the stop determination.

Accordingly, vehicle-stop determination apparatus 100 may perform stop determination by selecting one out of a plurality of functions, in accordance with the properties of a target of the stop determination. Further, vehicle-stop determination apparatus 100 may also be configured to perform a provisional stop determination using each of a plurality of functions, and perform a final stop determination based on the obtained plurality of provisional determination results.

Further, for example, in an attempt to perform a macroscopic stop determination for an unspecified large number of measuring targets, it is desirable to use a vehicle velocity transition model having a shape which is the most approximate to an average vehicle velocity transition.

Under such circumstances, the present inventors have conducted experiments for comparing the accuracy of the stop determination using various vehicle velocity transition models, in order to specify a suitable vehicle velocity transition model for the macroscopic stop determination.

EXPERIMENTAL EXAMPLES

Hereinafter, the contents of an experiment for accuracy comparison and the experimental results will be described.

This experiment was conducted in a certain section having a length of 200 km in a Metropolitan Expressway and a general road which are well seen from above the sky, using GPS traveling logs of an actual vehicle over the time period of four and a half hours. Here, the GPS traveling logs of the actual vehicle means time series data of GPS information, to which correct data obtained by visually determining whether or not the vehicle actually stopped was added.

The number of low velocity sections detected in the above-mentioned section and over the above-mentioned time period was 117; among those sections, the number of low velocity sections in which the vehicle actually stopped was 26. That is, the correct data of the number of the low velocity sections in which the vehicle stopped is 26.

The present inventors performed each of a conventional stop determination, linear function stop determination, quadratic function stop determination, and quartic function stop determination for the above-mentioned GPS traveling logs of the actual vehicle. Here, the conventional stop determination means a stop determination by means of a method of simulating related arts, and specifically means a method of determining that a vehicle has stopped, in 60 to 100 percent of the low velocity sections. The linear function stop determination means a stop determination by means of a vehicle velocity transition model of a V-shaped linear function. The quadratic function stop determination is a stop determination by means of a vehicle velocity transition model of a quadratic function. The quartic function stop determination is a stop determination by means of a vehicle velocity transition model of a quartic function.

Note that, while the V-shaped linear function has a bilaterally symmetrical shape in which a convex point is located at the center of the low velocity section, it may also have an asymmetrical shape. When the velocities at the first point and the second point are equal as in the present embodiment, the determination result does not vary, even when the position of the convex point is located anywhere in the low velocity section.

Further, in the present experiment, the "number of times of detection" is the number of the low velocity sections in which it was determined that the vehicle had stopped. The "number of times of missed detection" is the number of the low velocity sections in which it was not determined that the vehicle had stopped among the low velocity sections in which the vehicle had actually stopped. The "number of times of false detection" is the number of the low velocity section in which it was determined that the vehicle had stopped among the low velocity sections in which the vehicle had not actually stopped.

FIG. 6 is a diagram indicating the results of the experiment.

As illustrated in FIG. 6, in conventional stop determination experimental result 241, the number of times of detection was 117, the number of times of missed detection was 0 to 7, and the number of times of false detection was 55 to 91. In contrast, in linear function stop determination experimental result 242, the number of times of detection was 27, the number of times of missed detection was 2, and the number of times of false detection was 3. In quadratic function stop determination experimental result 243, the number of times of detection was 27, the number of times of missed detection was 3, and the number of times of false detection was 6, whereas in quartic function stop determination experimental result 244, the number of times of detection was 21, the number of times of missed detection was 9, and the number of times of false detection was 4.

That is, in every stop determination of a linear function stop determination, quadratic function stop determination, and quartic function stop determination, the results were as follows: the number of times of detection was overwhelmingly close to the correct data of 26, and the number of times of missed detection and the number of times of false detection were also substantially small, compared to the conventional stop determination.

Thus, it has become clear, also from the experimental results, that the stop determinations of the linear function stop determination, the quadratic function stop determination, and the quartic function stop determination can obtain extremely high accuracy, compared to the conventional stop determination.

In addition, this experiment gave a result in which the number of times of detection by means of the linear function stop determination and the number of times of detection by means of the quadratic function stop determination were close to the correct data, compared to the number of times of detection by means of the quartic function stop determination. Further, the experiment gave a result in which the number of times of missed detection and the number of times of false detection caused by the linear function stop determination are smaller than those caused by each of the quadratic function stop determination and the quartic function stop determination.

Thus, it has become clear, from the experimental results, that the linear function stop determination particularly achieved extremely high accuracy. Accordingly, it has been proven that the use of the vehicle velocity transition model having the shape of a linear function enables a macroscopic stop determination to be performed with higher accuracy.

Here, examples of actual velocity data and vehicle velocity transition models obtained from the above-mentioned GPS traveling log of the actual vehicle are shown in FIGS. 7A, 7B, 7C and 7D, and 8A, 8B, 8C and 8D, for reference. In FIGS. 7A, 7B, 7C and 7D, and 8A, 8B, 8C and 8D, the abscissa-axis indicates time, and the ordinate-axis indicates velocity.

Figure 7A:
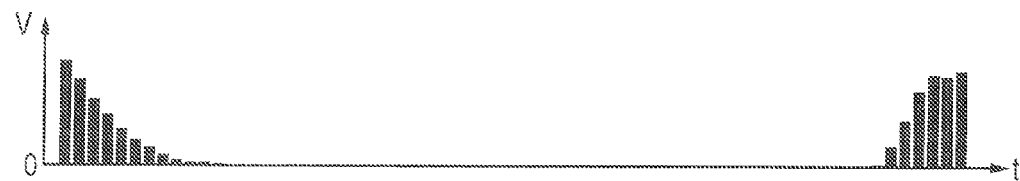
FIGS. 7A to 7D are diagrams showing actual velocity data of the low velocity section in which the vehicle stops and examples of a vehicle velocity transition model according to Embodiment 1.
Figure 7B:
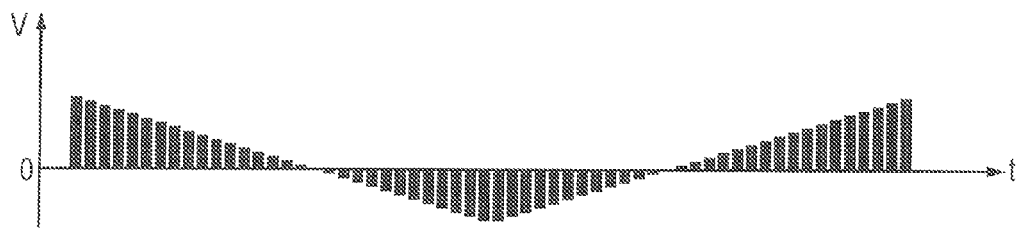
Figure 7C:
Figure 7D:
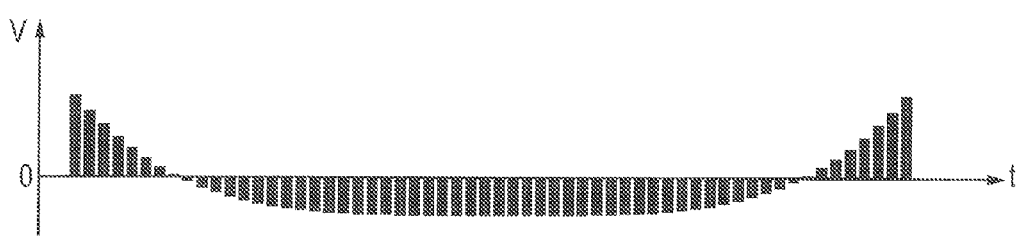

FIG. 7A shows actual velocity data during the low velocity section in which the vehicle stopped. FIGS. 7B, 7C and 7D, respectively, show the vehicle velocity transition model of a linear function, the vehicle velocity transition model of a quadratic function, and the vehicle velocity transition model of a quartic function, generated based on the measured data of FIG. 7A. Any of the vehicle velocity transition models has a section in which the velocity is negative.

Figure 8A:
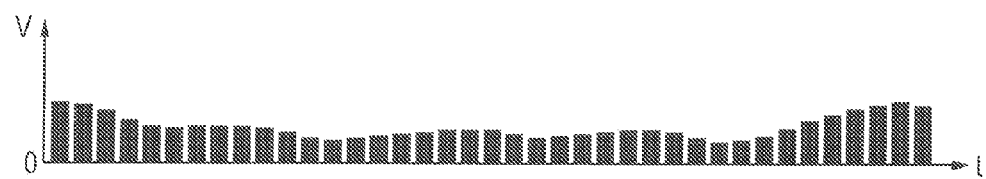
FIGS. 8A to 8D are diagrams showing actual velocity data of the low velocity section in which the vehicle does not stop and examples of a vehicle velocity transition model according to Embodiment 1.
Figure 8B:
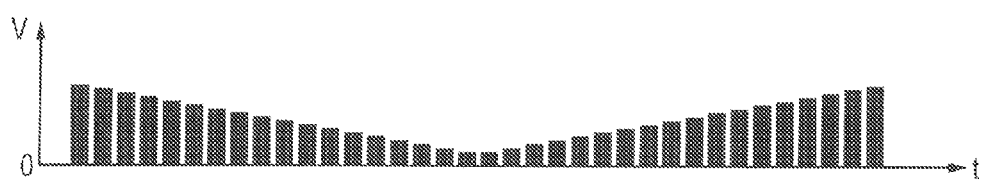
Figure 8C:
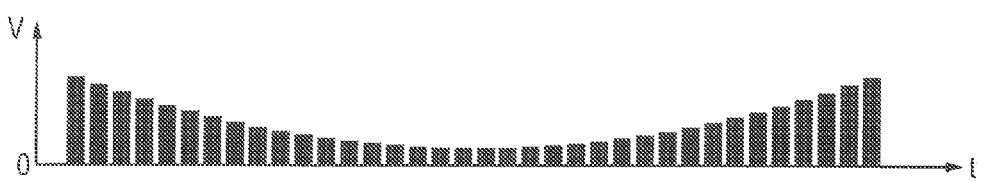
Figure 8D:
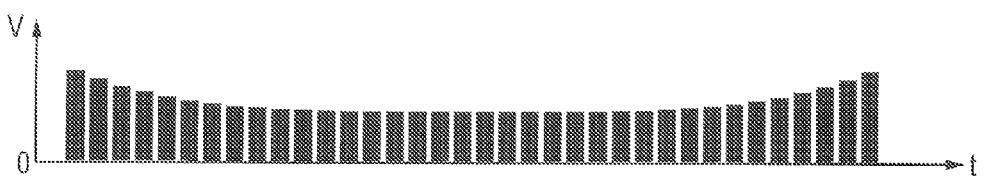

FIG. 8A shows actual velocity data during the low velocity section in which the vehicle did not stop. FIGS. 8B, 8C and 8D, respectively, show the vehicle velocity transition model of a linear function, the vehicle velocity transition model of a quadratic function, and the vehicle velocity transition model of a quartic function, generated based on the measured data of FIG. 8A. Any of the vehicle velocity transition models does not have a section in which the velocity is negative.

That is, it can be found that the presence/absence of the section in which the velocity is zero or lower in the vehicle velocity transition model reflects the presence/absence of the stop of the vehicle in the low velocity section.

Effects of the Present Embodiment

As described above, vehicle-stop determination apparatus 100 according to the present embodiment extracts a low velocity section from GPS information of a vehicle, and generates a vehicle velocity transition model in a downward convex shape, using the section distance and the required time of the low velocity section as constraint conditions. Thus, vehicle-stop determination apparatus 100 according to the present embodiment can generate such a vehicle velocity transition model as to have a section in which the velocity becomes zero or lower only when the vehicle has stopped in the low velocity section.

Vehicle-stop determination apparatus 100 according to the present embodiment determines that the vehicle has stopped, on condition that there is a section in which the velocity is zero or lower in the generated vehicle velocity transition model. Thus, vehicle-stop determination apparatus 100 according to the present embodiment can determine with high accuracy whether the vehicle has stopped from the GPS information of the vehicle.

In the case of a vehicle such as an automobile, for example, the traveling status of the automobile, in which the velocity decreases to 10 kilometers or lower per hour and subsequently exceeds 10 kilometers per hour again without stopping often occurs especially on a congested road. Accordingly, when the above-mentioned conventional stop determination is applied to have the number of times of detection substantially larger than correct data, it follows that a large amount of error detection data is accumulated in a system for recording such data of the low velocity section, for example. Thus, secondary problems such as pressure on the capacity of a storage memory and an increase in communication traffic volume also occur.

In this respect, vehicle-stop determination apparatus 100 according to the present embodiment can determine with high accuracy whether the vehicle has stopped, and thus can also solve such secondary problems.

Variation of the Present Embodiment

It is noted that vehicle-velocity-transition-model generating section 130 may generate a vehicle velocity transition model using acceleration as a further constraint condition.

In this case, for example, vehicle-velocity-transition-model generating section 130 acquires, from the measured velocity, a first acceleration which is the acceleration of the vehicle corresponding to the first time point and a second acceleration which is the acceleration of the vehicle corresponding to the second time point. Then, vehicle-velocity-transition-model generating section 130 generates a vehicle velocity transition model using the acquired first acceleration and second acceleration as constraint conditions.

For example, when using the vehicle velocity transition model of a quartic function, there are five functional parameters in total. When using threshold velocity Vth, section distance L of the low velocity section, and required time T as constraint conditions, vehicle-velocity-transition-model generating section 130 determines the maximum of three parameters, and prescribed values are to be used for the remaining two parameters. Here, when the first acceleration and the second acceleration are added as constraint conditions, it becomes possible to determine the remaining two parameters as well.

Stop determination section 140 may perform stop determination by means of a method that takes account of general measurement errors, or the like of GPS. For example, stop determination section 140 may be configured to determine that the velocity is zero or lower, on condition that the velocity is equal to or lower than a sum of zero and a positive correction value or negative correction value. Further, stop determination section 140 may be configured to determine that the velocity is zero or lower, on condition that the section in which the velocity is zero or lower exceeds a predetermined length.

The predetermined value corresponding to the first time point and the predetermined value corresponding to the second time point may be different. For example, when the velocity decreases sharply during deceleration, such a phenomenon may occur, in which, immediately after the velocity falls below threshold velocity Vth, the velocity decreases to such an extremely low velocity area that makes it difficult to measure the velocity, which undesirably lowers the detection accuracy of the vehicle velocity. For example, setting the value corresponding to the first time point at 15 km/h and the value corresponding to the second time point at 10 km/h can avoid and alleviate such a phenomenon.

Further, vehicle-velocity-transition-model generating section 130 may employ, as the shape of the vehicle velocity transition model, the shape of n-th function using an arbitrary positive number n, which shape is a convex shape in the direction of negative velocity.

Embodiment 2

Embodiment 2 of the present invention is an example of the specific aspect of the vehicle-stop determination system according to the present invention.

Figure 9:
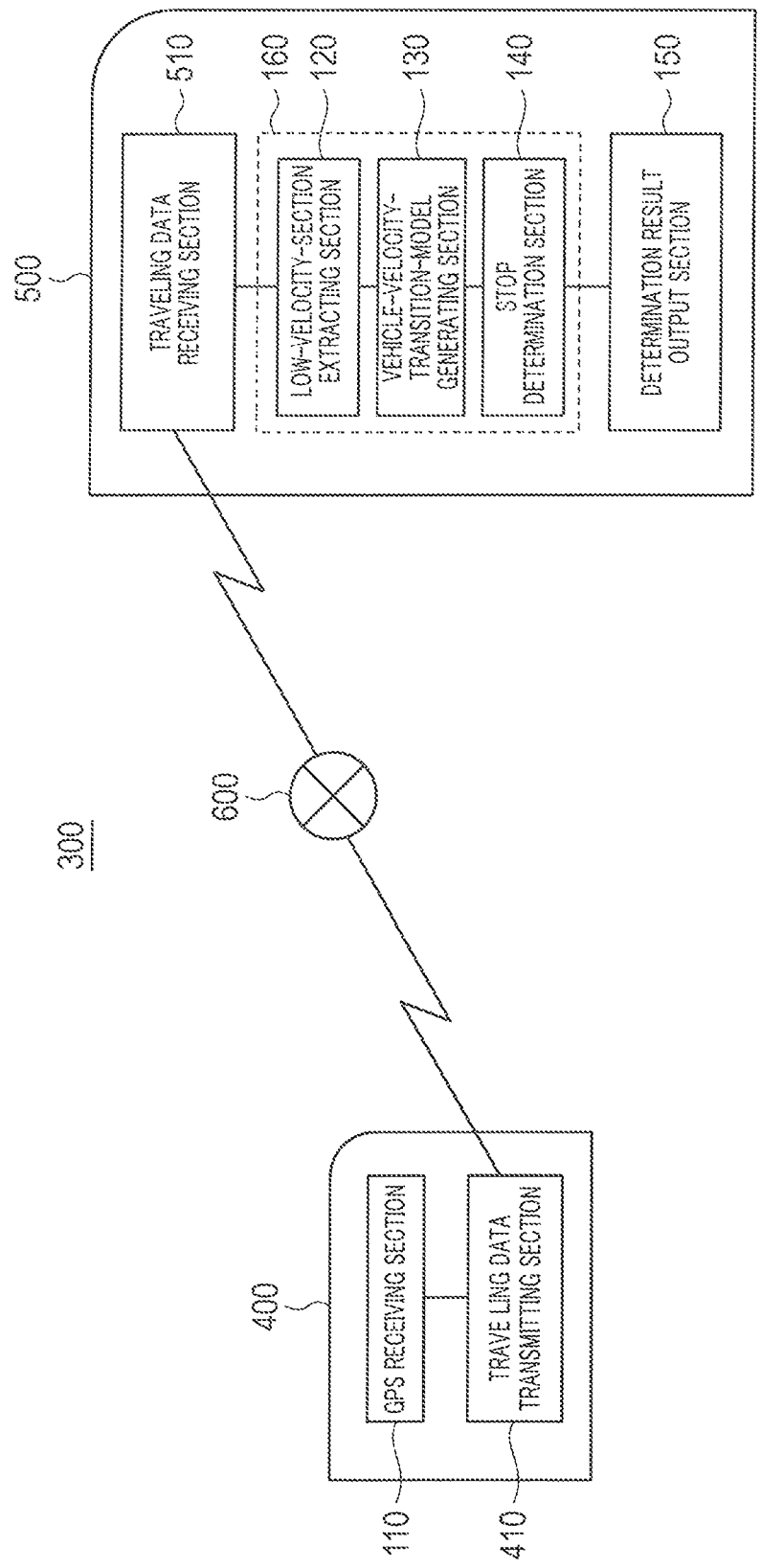
FIG. 9 is a block diagram illustrating an example of a configuration of a vehicle-stop determination system according to Embodiment 2 of the present invention.

FIG. 9 is a block diagram illustrating an example of the configuration of a vehicle-stop determination system according to the present embodiment, and corresponds to FIG. 1 of Embodiment 1. The same reference signs are given to the same components in FIG. 1, and the descriptions thereof will be omitted.

In FIG. 9, vehicle-stop determination system 300 includes terminal apparatus 400 and server apparatus 500. Terminal apparatus 400 is, for example, an OBU installed in a vehicle, or an information terminal carried by a passenger of the vehicle. Further, server apparatus 500 is, for example, an information collection server of a road traffic control center. Terminal apparatus 400 and server apparatus 500 are connected via communication network 600 including a wireless data communication line.

Terminal apparatus 400 includes GPS receiving section 110 and traveling data transmitting section 410. Further, server apparatus 500 includes traveling data receiving section 510, low-velocity-section extracting section 120, vehicle-velocity-transition-model generating section 130, stop determination section 140, and determination result output section 150.

Traveling data transmitting section 410 acquires GPS information received by GPS receiving section 110. Traveling data transmitting section 410 transmits to server apparatus 500 traveling data including the acquired GPS information and the identification information of a vehicle in which terminal apparatus 400 is installed (hereinafter, simply referred to as "vehicle").

Traveling data receiving section 510 receives the traveling data transmitted from the terminal apparatus, and outputs the received traveling data to low-velocity-section extracting section 120.

It is noted that each component of server apparatus 500 performs the processing of the stop determination described in Embodiment 1 for each vehicle, based on the identification information included in the traveling data. Further, while FIG. 9 illustrates one terminal apparatus 400 being connected to server apparatus 500, a plurality of terminal apparatuses 400 are connected to server apparatus 500 concurrently or at different times, in reality. Then, server apparatus 500 performs the stop determination as described in Embodiment 1, for a large number of low velocity sections.

Such vehicle-stop determination system 300 can collect GPS information from a plurality of vehicles, extract low velocity sections and perform stop determination for each vehicle. Further, vehicle-stop determination system 300 can grasp, record and utilize the driving conditions of the vehicle and the traffic conditions comprehensively and panoramically, from the results of the stop determination thus performed.

It is noted that terminal apparatus 400 may either transmit the acquired GPS information sequentially to server apparatus 500, or accumulate the information in a recording medium to transmit the accumulated GPS information collectively to server apparatus 500.

Vehicle-stop determination system 300 may have an apparatus that relays the transmission of the GPS information, disposed between terminal apparatus 400 and server apparatus 500.

The collection of the GPS information from a plurality of vehicles may be performed either via a wired data communication line, or by recording the GPS information into a recording medium and moving the recording medium.

After acquiring measured velocity to be obtained from the GPS information of the vehicle and performing stop determination based on the measured velocity, vehicle-stop determination system 300 may provide the vehicle with the result of the stop determination. In this case, determination result output section 150 of server apparatus 500 needs to transmit the determination result to terminal apparatus 400 by means of wireless communication, for example. Further, terminal apparatus 400 needs to be provided with a receiving section that receives the result of the stop determination transmitted from server apparatus 500.

The vehicle-stop determination result providing method of the present disclosure includes: acquiring a measured velocity which is a velocity of a vehicle obtained from GPS information of the vehicle, and providing the vehicle with a result of a stop determination performed based on the measured velocity, in which the stop determination is to determine that the vehicle has stopped during an interval from a first time point to a second time point when there is a section in which the velocity is zero or lower in a vehicle velocity transition model where the velocity decreases from the first time point and subsequently increases continuously to the second time point among vehicle velocity transition models indicating temporal transition of the velocity from the first time point at which the measured velocity falls below a predetermined value to the second time point at which the measured velocity exceeds a predetermined value.

It is noted that, in the vehicle-stop determination result providing method, the predetermined values at the first time point and the second time point may be the same.

In the vehicle-stop determination result providing method, the predetermined values at the first time point and the second time point may be different.

The vehicle-stop determination apparatus of the present disclosure is a vehicle-stop determination apparatus that determines from GPS information of a vehicle whether the vehicle has stopped, the apparatus including: a low-velocity-section extracting section that extracts a low velocity section being a section from a position of the vehicle at a first time point at which a measured velocity falls below a predetermined value to a position of the vehicle at a second time point at which the measured velocity exceeds a predetermined value, the measured velocity being a velocity of the vehicle obtained from the GPS information; a vehicle-velocity-transition-model generating section that generates a vehicle velocity transition model indicating temporal transition of a velocity which decreases from the first time point and subsequently increases continuously to the second time point, using, as constraint conditions, a section distance which is a length of the extracted low velocity section and a time from the first time point to the second time point; and a stop determination section that determines that the vehicle has stopped in the low velocity section, on condition that there is a section in which the velocity is zero or lower, in the generated vehicle velocity transition model.

It is noted that, in the vehicle-stop determination apparatus, the vehicle velocity transition model may have a shape that is convex in the direction of negative velocity and that continuously changes in the time-axis direction in the two-dimensional space composed of the time axis and the velocity axis.

In the vehicle-stop determination apparatus, the shape of the vehicle velocity transition model may be a V-shaped linear function shape.

In the vehicle-stop determination apparatus, the shape of the vehicle velocity transition model may be a quadratic function or quartic function shape.

In the vehicle-stop determination apparatus, the vehicle-velocity-transition-model generating section may generate, as the vehicle velocity transition model, a pseudo interpolation function which is a function exhibiting a shape of the vehicle velocity transition model in the two-dimensional space, and the stop determination section may determine whether a local minimum value of the velocity in the generated pseudo interpolation function is zero or lower, and may determine that the vehicle has stopped in the low velocity section, on condition that the local minimum value is zero or lower.

In the vehicle-stop determination apparatus, the stop determination section may determine that the vehicle has not stopped in the low velocity section, on condition that the local minimum value exceeds zero.

In the vehicle-stop determination apparatus, the vehicle-velocity-transition-model generating section may acquire first acceleration and second acceleration from the measured velocity, and generates the vehicle velocity transition model using the first acceleration and the second acceleration thus acquired, as constraint conditions, the first acceleration being acceleration of the vehicle corresponding to the first time point, the second acceleration being acceleration of the vehicle corresponding to the second time point.

In the vehicle-stop determination apparatus, the predetermined value corresponding to the first time point and the predetermined value corresponding to the second time point may be the same and may be each equal to a minimum value of a velocity which enables sufficient measurement accuracy to be obtained in GPS.

The vehicle-stop determination system of the present disclosure is a vehicle-stop determination system that determines from GPS information of a vehicle whether the vehicle has stopped, the vehicle-stop determination system including: a terminal apparatus installed in the vehicle; and a server apparatus that processes information concerning a traveling status of the vehicle, in which the terminal apparatus includes a GPS receiving section that receives a GPS signal, and acquires GPS information of the vehicle from the received GPS signal, and a traveling data transmitting section that transmits to the server apparatus traveling data including the acquired GPS information and identification information of the vehicle, and the server apparatus includes a traveling data receiving section that receives the traveling data transmitted from the terminal apparatus, a low-velocity-section extracting section that extracts a low velocity section being a section from a position of the vehicle at a first time point at which a measured velocity falls below a predetermined value to a position of the vehicle at a second time point at which the measured velocity exceeds a predetermined value, the measured velocity being obtained by measuring a velocity of the vehicle from the received traveling data, a vehicle-velocity-transition-model generating section that generates a vehicle velocity transition model indicating temporal transition of a velocity which decreases from the first time point and subsequently increases continuously to the second time point, using, as constraint conditions, a section distance which is a length of the extracted low velocity section and a time from the first time point to the second time point, a stop determination section that determines that the vehicle has stopped in the low velocity section, on condition that there is a section in which the velocity is zero or lower in the generated vehicle velocity transition model, and a determination result output section that outputs a determination result determined by the stop determination section.

The disclosure of Japanese Patent Application No. 2013-117864, filed on Jun. 4, 2013, including the specification, drawings and abstract, is incorporated herein by reference in its entirety.

INDUSTRIAL APPLICABILITY

The present invention is useful as a vehicle-stop determination result providing method, vehicle-stop determination apparatus, and vehicle-stop determination system, each capable of determining with high accuracy from GPS information of a vehicle whether the vehicle has stopped. More specifically, the present invention has a function of effectively performing the stop determination of a vehicle using a GPS, and is useful for traveling history analysis, traffic condition analysis, and the like. In addition, the present invention can also be applied to the effect measurement of the influence of the idling time and location of a vehicle on the environment, such as the emission of global-warming gases, and can also be applied to supporting reduction of environmental loads.

REFERENCE SIGNS LIST

100 Vehicle-stop determination apparatus
110 GPS receiving section
120 Low-velocity-section extracting section
130 Vehicle-velocity-transition-model generating section
140 Stop determination section
150 Determination result output section
160 Main component section
300 Vehicle-stop determination system
400 Terminal apparatus
410 Traveling data transmitting section
500 Server apparatus
510 Traveling data receiving section
600 Communication network

The invention claimed is:

1. A vehicle-stop determination apparatus that determines from GPS information of a vehicle whether the vehicle has stopped, the apparatus comprising:
a low-velocity-section extracting section that extracts a low velocity section being a section from a position of the vehicle at a first time point at which a measured velocity falls below a first predetermined value to a second position of the vehicle at a second time point at which the measured velocity exceeds a predetermined value, the measured velocity being a velocity of the vehicle obtained from the GPS information;
a vehicle-velocity-transition-model generating section that generates a vehicle velocity transition model indicating temporal transition of a velocity which decreases from the first time point and subsequently increases continuously to the second time point, using, as constraint conditions, a section distance which is a length of the extracted low velocity section and a time from the first time point to the second time point; and
a stop determination section that determines that the vehicle has stopped in the low velocity section, on condition that there is a section in which the velocity is zero or lower, in the generated vehicle velocity transition model.

2. The vehicle-stop determination apparatus according to claim 1, wherein the vehicle velocity transition model has a shape that is convex in a direction of negative velocity and that continuously changes in a time-axis direction in a two-dimensional space composed of a time axis and a velocity axis.

3. The vehicle-stop determination apparatus according to claim 2, wherein the shape of the vehicle velocity transition model is a V-shaped linear function shape.

4. The vehicle-stop determination apparatus according to claim 2, wherein the shape of the vehicle velocity transition model is a quadratic function or quartic function shape.

5. The vehicle-stop determination apparatus according to claim 2,
wherein
the vehicle-velocity-transition-model generating section generates, as the vehicle velocity transition model, a pseudo interpolation function which is a function exhibiting a shape of the vehicle velocity transition model in the two-dimensional space, and
the stop determination section determines whether or not a local minimum value of a velocity in the generated pseudo interpolation function is zero or lower, and determines that the vehicle has stopped in the low velocity section, on condition that the local minimum value is zero or lower.

6. The vehicle-stop determination apparatus according to claim 5, wherein the stop determination section determines that the vehicle has not stopped in the low velocity section, on condition that the local minimum value exceeds zero.

7. The vehicle-stop determination apparatus according to claim 1, wherein the vehicle-velocity-transition-model generating section acquires first acceleration and second acceleration from the measured velocity, and generates the vehicle velocity transition model using the first acceleration and the second acceleration thus acquired, as constraint conditions, the first acceleration being acceleration of the vehicle corresponding to the first time point, the second acceleration being acceleration of the vehicle corresponding to the second time point.

8. The vehicle-stop determination apparatus according to claim 1, wherein the first predetermined value corresponding to the first time point and the second predetermined value corresponding to the second time point are the same and are each equal to a minimum value of a velocity which enables sufficient measurement accuracy to be obtained in GPS.

9. A vehicle-stop determination system that determines from GPS information of a vehicle whether the vehicle has stopped, the vehicle-stop determination system comprising:
a terminal apparatus installed in the vehicle; and
a server apparatus that processes information concerning a traveling status of the vehicle,
wherein
the terminal apparatus includes:
a GPS receiving section that receives a GPS signal, and acquires GPS information of the vehicle from the received GPS signal, and
a traveling data transmitting section that transmits to the server apparatus traveling data including the acquired GPS information and identification information of the vehicle, and
the server apparatus includes:
a traveling data receiving section that receives the traveling data transmitted from the terminal apparatus,
a low-velocity-section extracting section that extracts a low velocity section being a section from a position of the vehicle at a first time point at which a measured velocity falls below a first predetermined value to a second position of the vehicle at a second time point at which the measured velocity exceeds a predetermined value, the measured velocity being obtained by measuring a velocity of the vehicle from the received traveling data,
a vehicle-velocity-transition-model generating section that generates a vehicle velocity transition model indicating temporal transition of a velocity which decreases from the first time point and subsequently increases continuously to the second time point, using, as constraint conditions, a section distance which is a length of the extracted low velocity section and a time from the first time point to the second time point,
a stop determination section that determines that the vehicle has stopped in the low velocity section, on condition that there is a section in which the velocity is zero or lower in the generated vehicle velocity transition model, and
a determination result output section that outputs a determination result determined by the stop determination section.

* * * * *